United States Patent [19]
Chamot et al.

[11] Patent Number: 5,961,039
[45] Date of Patent: Oct. 5, 1999

[54] RAPIDLY MOUNTED THERMOSTAT

[75] Inventors: Jean Chamot, Arpajon; Claude Henault, St Forget les Sablons, both of France

[73] Assignee: Vernet S.A., Arpajon Cedex, France

[21] Appl. No.: 09/033,716

[22] Filed: Mar. 3, 1998

[30] Foreign Application Priority Data

Mar. 4, 1997 [FR] France .................................. 97 02562

[51] Int. Cl.$^6$ .......................................................... F01P 7/02
[52] U.S. Cl. ............................................ 236/93 R; 236/34
[58] Field of Search .................................. 236/34.4, 93 R

[56] References Cited

U.S. PATENT DOCUMENTS

| | | | |
|---|---|---|---|
| 3,136,337 | 6/1964 | Fox ..................... | 137/625.48 |
| 3,485,448 | 12/1969 | Coudriet ................ | 236/34 |
| 3,558,046 | 1/1971 | Kelly ..................... | 236/34 |
| 3,785,554 | 1/1974 | Proctor .................. | 236/34 |
| 3,858,801 | 1/1975 | Backman ................ | 236/34 |
| 3,917,163 | 11/1975 | Obermaier et al. ....... | 236/34 |
| 5,231,955 | 8/1993 | Saur et al. . | |
| 5,279,264 | 1/1994 | Simmons et al. ........ | 123/41.1 |
| 5,292,064 | 3/1994 | Saur et al. . | |
| 5,844,463 | 12/1998 | Trapy ................... | 137/625.48 |

FOREIGN PATENT DOCUMENTS

| | | |
|---|---|---|
| 0 486 757 | 5/1992 | European Pat. Off. . |
| 0 600 151 | 6/1994 | European Pat. Off. . |
| 0 661 486 | 7/1995 | European Pat. Off. . |
| 25 03 946 | 8/1976 | Germany . |
| 41 39 328 | 6/1993 | Germany . |
| 1 382 408 | 1/1975 | United Kingdom . |

*Primary Examiner*—Henry Bennett
*Attorney, Agent, or Firm*—Wenderoth, Lind & Ponack, L.L.P.

[57] ABSTRACT

A thermostat comprises a case (1) forming an elbow through which extends a fluid passageway 2 comprising a fluid inlet region (22) and a fluid outlet region (21) and containing a thermostatic element (3). The thermostatic element (3) includes a fixed part (31), a movable part (32) which carries a closing device (4) cooperating with a seat (23), a bridge (5) in which the movable part (32) is slidable, and a spring (6) biasing the bridge (5) away from the closing device (4). The case (1) is in one piece; the fixed part (31) bears against the wall of the passageway (2); the inlet region (22) comprises inwardly extending projections (19) for blocking movement of the bridge (5) caused by the spring before mounting the thermostat on a support. The bridge (5) carries tabs projecting in the upstream direction and outwardly so that when the thermostat is fixed on the support (S) they are urged back by the support (S) in the downstream direction and the force exerted by the spring (6) on the bridge (5) is transferred from the projections of the passageway (2) to the support (S).

10 Claims, 3 Drawing Sheets

RAPIDLY MOUNTED THERMOSTAT

BACKGROUND OF THE INVENTION

The invention relates to thermostats for regulating the flow of a fluid, in particular in a heat engine cooling circuit.

A thermostat as shown in FIGS. 1, 2 and 3 is known and is insertable between fluid pipes or preferably directly adaptable to the cylinder head of an engine.

This thermostat comprises a case 1 forming an elbow, usually of aluminum or molded aluminum alloy, adapted to be fixed to a support S (flange of a fluid pipe or cylinder head of an engine) and in which extends an inner passageway 2 for the fluid including a bend and having a fluid outlet region 21 remote from the support and a fluid inlet region 22 adjacent to the support, and a thermostatic element 3 disposed in the passageway and comprising two parts 31, 32 which are movable relative to each other.

A first part 31 of the thermostatic element 3 is maintained in a fixed position in the case. A second part 32 extends on the upstream side of the first part and carries a closing device 4 adapted to cooperate with a seat 23 provided in a narrowed region of the case. The second part is movable in translation relative to the first part for moving the closing device away from and toward the seat to a position of contact with the seat.

The free end of the first part 31 of the thermostatic element 3 is supported in a socket 10 centered on the longitudinal axis of the passageway, carried by at least one longitudinal rib extending radially in the passageway 2 from the wall of the latter; the second part 32 is carried and guided in its movement by a bridge 5 which is in contact by at least one region of its periphery with the wall of the passageway 2 and provided with a central opening in which this second part is slidably mounted. The closing device 4 and the bridge 5 are subjected to the force exerted by a coil spring 6, here cylindrical, which biases them away from each other.

The case 1 is in two parts 1A, 1B in which there are arranged respectively the fluid outlet region 21 and the fluid inlet region 22, and the thermostatic element is disposed in a portion of the fluid outlet part which extends along a rectilinear central axis, the upstream portion of the outlet part 1A being itself disposed in the downstream portion of the inlet part which is in the form of an elbow.

The upstream portion of the outlet part 1A comprises two fingers 11 which extend on the upstream side of the seat 23 the wall of the passageway for the fluid. The fingers 11 are diametrally opposed and define two respective transverse grooves in confronting relation; the bridge 5 is held fast against the upstream shoulders of these grooves 12 under the effect of the spring 6.

The two parts 1A, 1B constituting the case 1 comprise externally confronting flanges 13, 14 having ears provided with openings for the passage of fixing screws; the seal between the two parts 1A, 1B is provided by an elastically deformable annular sealing element 7 which is inserted in a groove extending circumferentially in one of the flanges in confronting relation to the other flange and is crushed against this other flange.

The outlet part 1A of the case further comprises a pipe 16 extending radially outside the outlet part and having its inner passage opening into the passageway on the downstream side of the seat 23; likewise, the inlet part 1B of the case further comprises an attached pipe 17 extending outwardly and having its inner passage opening into the passageway on the upstream side of the seat.

The case 1 is generally in the form of a right-angled elbow bearing in mind the implantation of the various components disposed under the hood of the vehicle engine, and the upstream portion of the outlet part 1A comprising the two fingers 11 between which the upstream region of the movable part 32 of the thermostatic element 3 is disposed extends in the downstream portion and in the elbow of the inlet part 1B.

The seal between the case 1 and its support is provided by an elastically yieldable sealing element 8 inserted in a recess extending around the inlet opening of the inlet region 22 of the inlet part 1B.

Consequently, the thermostat is made up of a relatively large number of parts and the thermostatic element 3 can only be mounted and dismounted through the upstream end of the outlet part 1A when the two parts 1A, 1B constituting the case 1 are separated; moreover, the force exerted by the bridge 5 biased by the spring 6 is exerted on the case 1 and more precisely on the upstream fingers 11 of the outlet part 1A which are relatively fragile, which jeopardizes the reliability of the case and consequently of the thermostat, unless there is used a relatively strong material such as relatively expensive aluminum or an aluminum alloy.

SUMMARY OF THE INVENTION

An object of the invention is to overcome these drawbacks. To provide for this purpose, a thermostat is provided which is of the type comprising a case forming an elbow adapted to be fixed to a support and in which extends an inner passageway for a fluid which includes a bend, a fluid outlet region remote from the support and a fluid inlet region adjacent to the support, and a thermostatic element comprising two relatively movable parts. A first part of the thermostatic element is maintained in a fixed position in the case and the second part extends on the upstream side of the first part and carries a closing device adapted to cooperate with a seat provided in a narrowed region of the case. The second part is movable in translation relative to the first part for moving the closing device away from and toward the seat to a position of contact with the seat, and is guided on the upstream side of the closing device by guide means subjected to a return force in the upstream direction exerted by elastically yieldable means. The thermostat is characterized in that the case is in one piece and the thermostatic element is disposed in the passageway of the case. The first part of the thermostatic element bears against a region of the wall of the passageway close to the bend of the latter and is centered on the inlet region, and the inlet region comprises means for connecting the guide means to the wall of the passageway.

Owing to the fact that the case is in one piece, its strength is increased and the use of a sealing element and assembling parts such as screws is avoided.

According to a preferred advantageous feature, the invention is a thermostat such as the type defined hereinbefore in which the guide means is a bridge which has end portions fitted in the passageway and is provided with an opening in which the second part of the thermostatic element is slidably mounted, the closing device and the bridge being subjected to the force of a spring biasing them away from each other. The connecting means comprises projections extending into the passageway for blocking movement of the bridge in the upstream direction under the effect of the spring before the mounting of the thermostat on the support. The bridge carries at least one tab extending in the upstream direction beyond the upstream end of the case and also transversely outwardly beyond the facing walls of the projections, so that, when the thermostat is fixed on the support, the tab is urged back by the support in the downstream direction in the passageway and the force exerted by the spring on the bridge is transferred from the projections to the support.

Owing to the fact that one of the parts of the thermostatic element bears against a wall of the passageway and the other part extends in the upstream direction through a bridge blocked by the projections in the inlet region of the case, it is possible to mount the thermostatic element in the case rapidly by a bayonet-type assembly movement which will be better understood hereinafter.

Owing to the fact that the bridge carries at least one tab which projects beyond the upstream end of the case and also extends radially outwardly, the mounting of the case on the support automatically eliminates the bearing of this bridge against the projections and relieves the latter of the force exerted by the spring. Consequently, it becomes possible to make the case of a synthetic material, for example a thermoplastic or thermosetting material, since the properties, in particular the mechanical properties, required of the case are much less demanding than in the past owing to the fact that the force is transferred.

Further features and advantages of the invention will be apparent from the following description of one embodiment of the invention which is given by way of a non-limitative example with reference to the accompanying drawings.

DETAILED DESCRIPTION OF THE DRAWINGS

Figure 1:
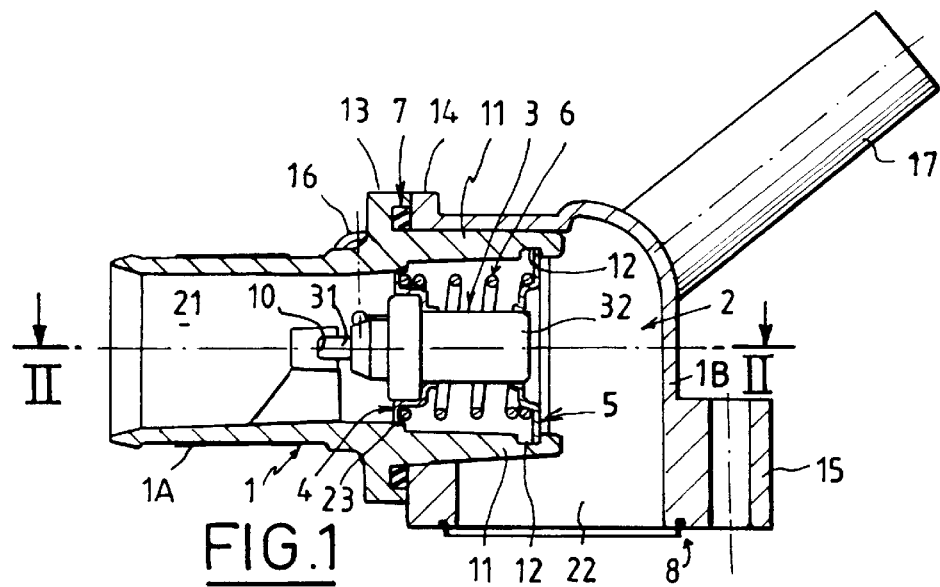
FIG. 1 is a diagrammatic longitudinal sectional view of the known thermostat described hereinbefore, taken on line I—I of FIG. 2.
Figure 2:
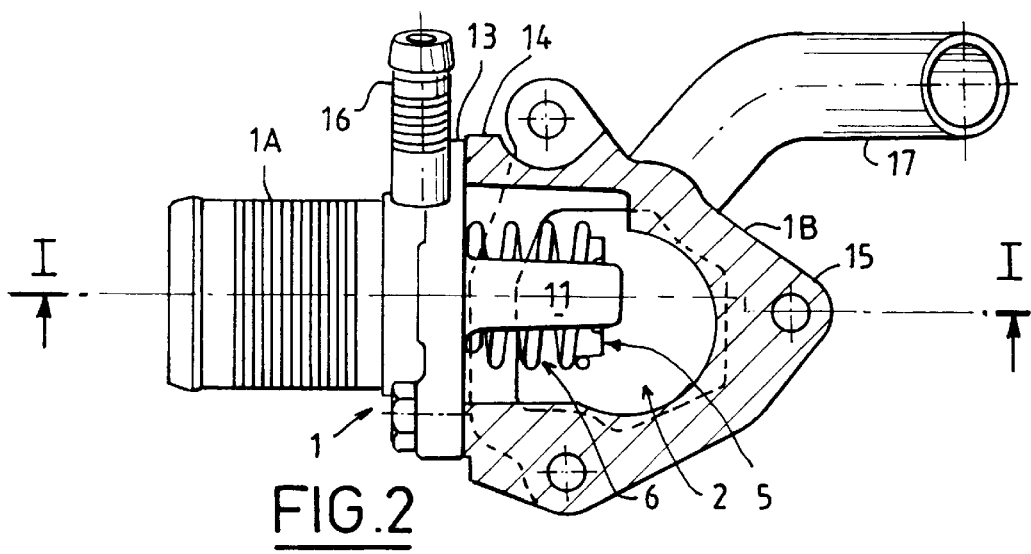
FIG. 2 is a top view relative to FIG. 1 of the thermostat of this Figure, one of the component parts of its case being shown in section on line II—II of FIG. 1.
Figure 3:
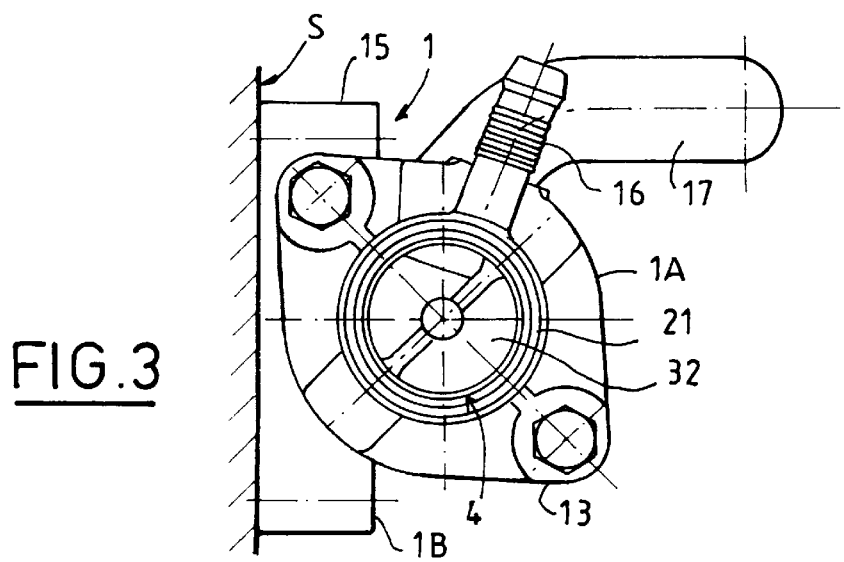
FIG. 3 is a diagrammatic bottom view of the thermostat of FIG. 1.
Figure 4:
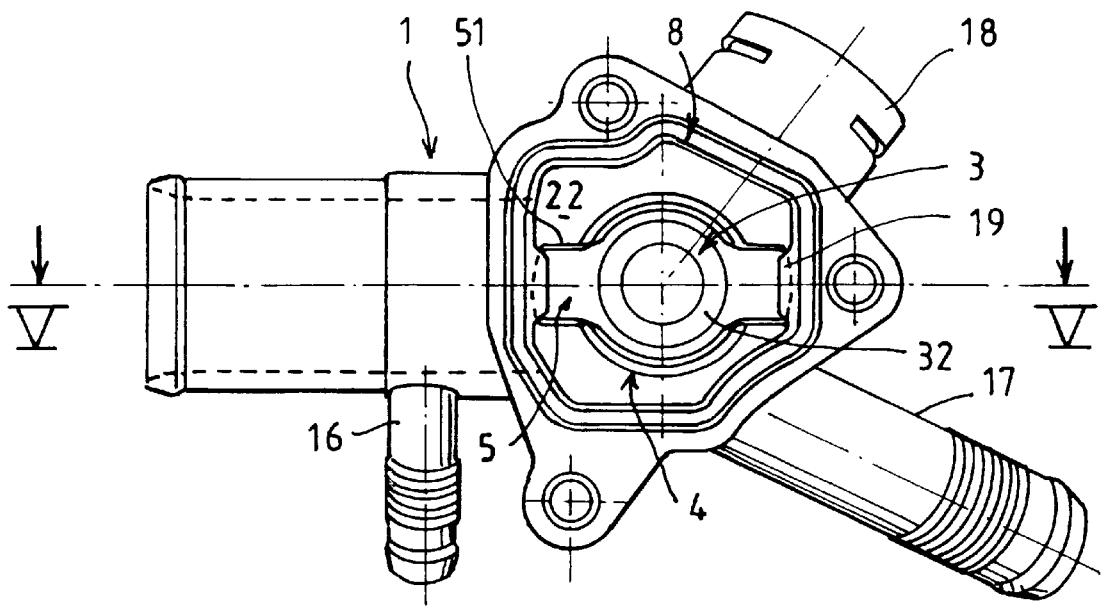
FIG. 4 is a diagrammatic bottom view of a thermostat according to the invention.
Figure 5:
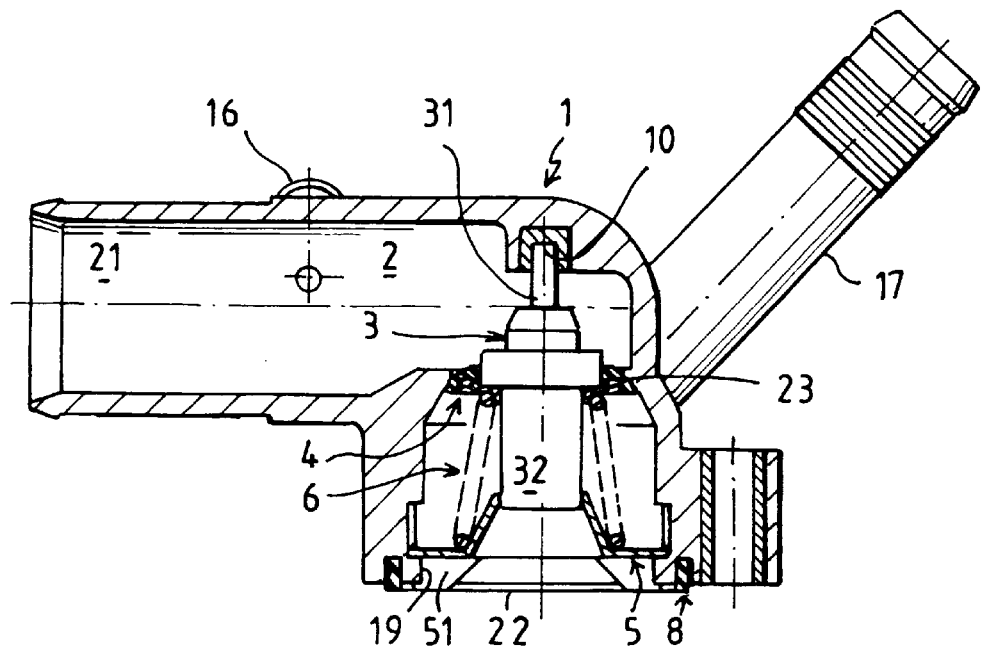
FIG. 5 is a diagrammatic longitudinal sectional view of the thermostat according to the invention of FIG. 4, taken on line V—V of this Figure.
Figure 6:
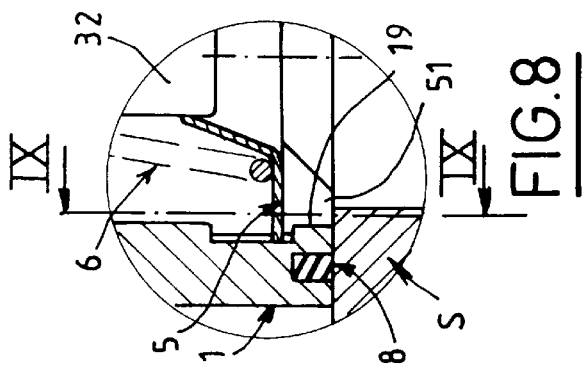
FIG. 6 is a view to a very large scale of a detail of FIG. 5.
Figure 7:
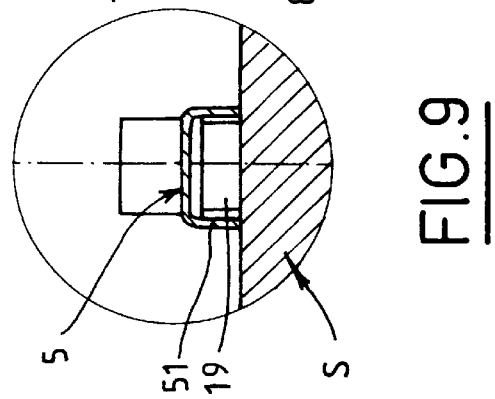
FIG. 7 is a sectional view taken on line VII—VII of FIG. 6.

As the thermostat according to the invention shown in FIGS. 4 to 10 has a number of features in common with the known thermostat shown in FIGS. 1 to 3, the corresponding component parts have been designated by the same reference numerals.

This thermostat, which is arranged to be perfectly interchangeable with the known thermostat of FIGS. 1 to 3, comprises a case 1, here in the form of a right-angled elbow adapted to be fixed to an identical support; inside, there extends a passageway 2 for the fluid, also including a right-angled bend and having a fluid outlet region 21 remote from the support and a fluid inlet region 22 adjacent to the latter; a thermostatic element 3 completely disposed in the passageway comprises two parts 31, 32 which are relatively movable, namely a first part 31 maintained in a fixed position in the case and a second part 32 which extends on the upstream side of the first part, carries a closing device 4 adapted to cooperate with a seat 23 provided in a narrowed region of the case, and is movable in translation relative to the first part.

On the other hand, the case 1 is in one piece and although the free end of the first part 31 of the thermostatic element, maintained in a fixed position, bears in a socket 10 centered on the longitudinal axis of the passageway, this does not concern the longitudinal axis of the part of the case previously corresponding to the outlet part 1A, but that of the part corresponding to the inlet part 1B; in other words, the thermostatic element 3 and the support of the latter in the case 1 are not centered on the central axis of the outlet region but on that of the inlet region of the case. Under these conditions, it is no longer necessary to provide a rib projecting into the passageway 2 for carrying the socket 10 and the latter is formed in the very wall of the case or in a bushing inserted in this wall, in the region of the bend of the passageway 2 which faces the inlet opening of the passageway.

The second part 32 of the thermostatic element is carried and guided in its movement by a bridge 5 which has end portions fitted in the passageway 2 and is provided with a central opening in which this second part is slidably mounted. The closing device 4 and the bridge 5 are again subjected to the force of an approximately helical spring 6 which is here in the shape of a truncated cone and biases the closing device 4 and bridge 5 away from each other; in order to block movement of the bridge in the upstream direction under the effect of the spring before mounting the thermostat, the fluid inlet region comprises projections 19, here two opposite projections, extending toward the center of the passageway 2; the distance between these projections 19 is less than the length of the bridge 5, but the inlet region 22 of the passageway 2 has, extending in at least one transverse direction other than that in which the projections extend, an opening which has a greater extent than the length of the bridge and a width exceeding that of the latter; in this way, the thermostatic element 3 can be inserted in the case, in opposition to the force exerted by the spring 6, by orienting the bridge 5 in said other direction and then turning it about its axis through an angle to bring the end portions of the bridge in facing relation to the projections and releasing it to allow these end portions to be applied against the shoulders of the projections while the fixed part 31 of the thermostatic element is inserted in its socket 10 (bayonet assembly); the angle between the direction in which the opening for inserting the bridge extends and the direction in which the projections extend is for example of the order of 45°.

Figure 8:
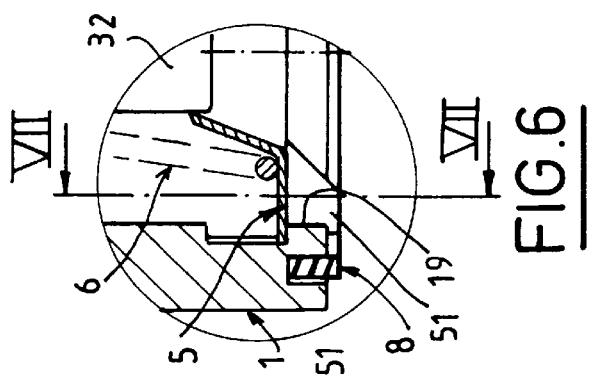
FIG. 8 is a view corresponding to FIG. 6 when the thermostat is mounted on a support such as an engine cylinder head.
Figure 9:
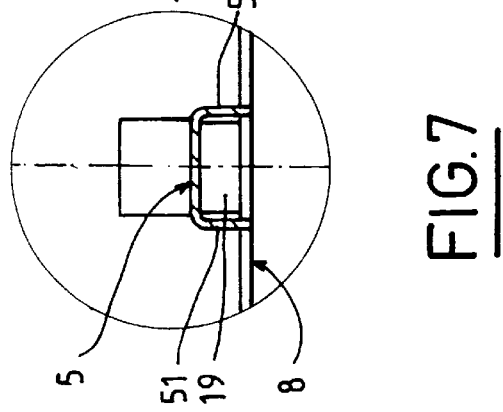
FIG. 9 is a sectional view taken on line IX—IX of FIG. 8.
Figure 10:
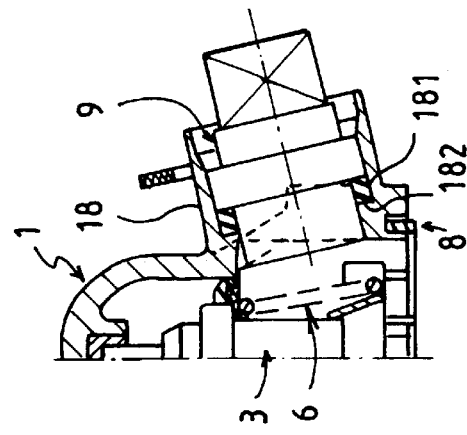
FIG. 10 is diagrammatic partial sectional view of the thermostat according to the invention of FIG. 4 showing the mounting of a temperature probe on this thermostat.

Further, in order to ensure that the relatively large force exerted in operation by the return spring 6 on the bridge 5, is not transmitted to the case 1 but to its support, the bridge 5 has, at least in proximity to its ends, a U-shaped cross section forming lateral branches which define wings or tabs 51 spaced apart a distance exceeding the width of the projections 9 and extending in a direction toward the support, these tabs having a height exceeding the distance between the bearing surfaces for the bridge 5 on the projections 19 of the case 1 and the free end of the upstream side of the case. In this way, when the thermostat is separated from the support, the bridge 5 rests on the shoulders of the projections 19 with its tabs extending transversely of the passageway on each side of these projections (FIGS. 4 to 7). On the other hand, when the thermostat is being mounted on its support the outlet opening of which has in at least one direction parallel to that in which the projections of the case extend, an opening smaller than the distance between the respective extremities of the tabs 51, the surface of the support facing the case urges back in the downstream direction these tabs which project in the upstream direction; in this way, the bridge leaves its support against the shoulders of the projections 19 of the case and then remains supported against the support (metal engine block or cylinder head), through the medium of the tabs (FIGS. 8 and 9).

A pipe 16 extends radially outside the case 1 and opens into the passageway 2 on the downstream side of the seat, and a pipe 17 extends outwardly and opens into the passageway 2 on the upstream side of the seat. Another pipe 18 also opens into the passageway 2 on the upstream side of the seat for mounting a temperature probe (FIG. 10) as will be explained in more detail hereinafter. These pipes may be made in one piece with the case 1.

The seal between the case 1 and its support is provided by an elastically deformable sealing element 8 disposed in a groove extending around the inlet opening of the inlet region 22 at a distance from this opening.

When the case 1 is of a synthetic material, for example a thermoplastic material, the support created in the wall of the passageway 2 for the fixed part 31 of the thermostatic element may be advantageously provided with a metal bushing defining a cavity constituting the socket 10 for this fixed part 31.

The closing device may be made in a plurality of parts, for example a part of synthetic material for bearing against the seat 23 of the case and a metal cup or bridge bearing against a shoulder of a flange of the movable part 32 of the thermostatic element.

Preferably, the seat 23 for the closing device 4 is provided on the upstream side of the bend of the passageway 2 in the region of transition between the bend and the part of the case which extends in the upstream direction to the inlet region 22 of the passageway; it has for example a tapered shape divergent in the upstream direction.

If the upstream end of the movable part 32 of the thermostatic element 3 is set back in the downstream direction relative to the projections 19 when the closing device 4 is placed against its seat 23, the bridge 5 is set back in the downstream direction in its central part; this set-back central part may be formed by portions of the bridge which are inclined and have a base which may advantageously constitute guide means for the spring 6 preventing the lateral displacement of the upstream end of the latter.

In order to facilitate the connections, the periphery of the pipes may be provided with annular corrugations.

The third pipe 18 is, as explained, adapted to receive a temperature probe 9; for sealing purposes, an annular sealing element 181 is inserted between the probe 9 and the wall of the pipe 18 and bears against a shoulder 182 of the pipe corresponding to a reduction in the inside diameter of the latter in the direction toward the interior of the case 1.

It must be understood that the scope of the invention is not intended to be limited to the embodiment described hereinbefore and illustrated. Other embodiments may be envisaged without departing from the scope of the invention and in particular the case may be made of very diverse materials bearing in mind the fact that the mechanical stresses to which it is subjected are substantially lower than those to which the case is subjected in the known thermostats operating under the same working conditions.

What is claimed is:

1. A thermostat comprising in combination: a case in one piece forming an elbow and having an inlet end face for fixing to a support, said case having a wall defining an inner fluid passageway which includes a bend and extends through said case, said passageway having a fluid outlet region remote from said inlet end face and a fluid inlet region adjacent to said inlet end face, a thermostatic element disposed in said passageway and comprising a first part and a second part which are relatively movable, means for supporting said first part in a fixed position in said case, said second part extending from said first part in an upstream direction relative to fluid flow in said passageway, a seat provided in a narrowed region of said passageway, a closing device carried by said second part and cooperative with said seat, said second part being movable in translation relative to said first part for moving said closing device selectively away from and toward said seat to a position of contact with said seat, guide means for guiding said second part on the upstream side of said closing device, elastically yieldable means subjecting said guide means to a return force biasing said guide means in the upstream direction, said first part of said thermostatic element being supported in a region of said wall defining said passageway close to said bend and centered on said inlet region, said inlet region having projections extending into said inlet region of said passageway for connecting said guide means to said wall and blocking the movement of said guide means in the upstream direction produced by said elastically yieldable means, and said guide means carrying at least one tab extending in the upstream direction beyond said inlet end face when the thermostat is not mounted on the support and also extending transversely outwardly beyond walls of said projections, whereby, when said thermostat is fixed on said support, said at least one tab is urged by the support in the downstream direction in said passageway and the force exerted by said elastically yieldable means on said guide means is transferred from said projections to the support.

2. A thermostat according to claim 1, wherein said guide means is a bridge which has end portions fitted in said passageway and is provided with an opening in which said second part of said thermostatic element is slidably mounted, said elastically yieldable means comprises a spring interposed between said closing device and said bridge for biasing said closing device and said bridge away from each other, and said projections extend into said passageway for blocking the movement of said bridge in the upstream direction under the effect of said spring before the mounting of the thermostat on said support.

3. A thermostat according to claim 1, wherein said case is of synthetic material.

4. A thermostat according to claim 1, wherein said region of said wall in which said first part of said thermostatic element is supported is provided with a bushing defining a socket in which said fixed part is inserted.

5. A thermostat according to claim 1, wherein said seat is provided on the upstream side of said bend in a transition region between said bend and a portion of said case which extends in the upstream direction to said fluid inlet region.

6. A thermostat according to claim 2, wherein said projections define bearing surfaces for said end portions of said bridge and said bridge has a U-shaped cross section forming lateral branches which define tabs and have a height exceeding the distance between said bearing surfaces and said inlet end face for fixing to the support.

7. A thermostat according to claim 2, wherein said bridge has a U-shaped cross section forming lateral branches which define tabs and extend transversely of said passageway on opposing sides of said projections so as to face a surface of the support confronting said case.

8. A thermostat according to claim 2, wherein said bridge has in its central part a portion set back in the downstream direction.

9. A thermostat according to claim 1, wherein said case comprises exterior pipes in one piece therewith.

10. A thermostat according to claim 1, wherein said case comprises an exterior pipe in one piece therewith for inserting and mounting a temperature probe in said pipe.

* * * * *